(12) United States Patent
Izatt

(10) Patent No.: US 7,621,352 B2
(45) Date of Patent: Nov. 24, 2009

(54) APPARATUS, SYSTEM, AND METHOD FOR CATCHING A CORE

(76) Inventor: Tony Izatt, 1694 S. 3600 West, Weston, ID (US) 83286

( * ) Notice: Subject to any disclaimer, the term of this patent is extended or adjusted under 35 U.S.C. 154(b) by 0 days.

(21) Appl. No.: 12/047,143

(22) Filed: Mar. 12, 2008

(65) Prior Publication Data

US 2009/0229885 A1 Sep. 17, 2009

(51) Int. Cl.
*E21B 10/48* (2006.01)

(52) U.S. Cl. ..................... 175/403; 299/41.1

(58) Field of Classification Search ........... 175/20, 175/245, 244, 246, 247, 248, 249, 58; 408/204, 408/67, 68; 299/41.1
See application file for complete search history.

(56) References Cited

U.S. PATENT DOCUMENTS

| | | | | |
|---|---|---|---|---|
| 4,279,551 A * | 7/1981 | Wilterding | ............... | 408/67 |
| 6,206,616 B1 * | 3/2001 | Smith et al. | ............... | 408/1 R |
| 6,514,017 B2 * | 2/2003 | DeBlasio | ............... | 408/1 R |
| 6,558,089 B2 * | 5/2003 | DeBlasio | ............... | 408/239 A |
| 7,357,605 B2 * | 4/2008 | Weiler | ............... | 408/67 |
| 2004/0191014 A1 * | 9/2004 | May | ............... | 408/67 |

\* cited by examiner

*Primary Examiner*—David J Bagnell
*Assistant Examiner*—James G. Sayre
(74) *Attorney, Agent, or Firm*—Kunzler & McKenzie

(57) ABSTRACT

A core catcher includes a catcher rod removably attachable to a core drill. The catcher rod is inserted through a pilot hole in a substrate from which a core is to be removed. A catching element is removably attachable such as by clamping the catching element to a distal end of the catcher rod on an underside of the substrate. A bearing may be disposed between the catching element and the substrate. When severed from the substrate, the core falls only a short distance along the catcher rod and comes to rest on the bearing and the catching element. Thus, the core is inhibited from falling to a floor or ground below the substrate. A bucket may also be supported on the distal end of the catcher rod in order to collect cutting fluid.

22 Claims, 5 Drawing Sheets

APPARATUS, SYSTEM, AND METHOD FOR CATCHING A CORE

BACKGROUND OF THE INVENTION

1. Field of the Invention

This invention relates to core cutting machines and more particularly relates to an apparatus, system, and method for catching cores severed from substrates during core cutting.

2. Description of the Related Art

Core cutting machines are used extensively for creating openings through substrates such as walls or floors in buildings or other structures. These openings provide passageways for ducting, electrical lines, or plumbing, for example. Core cutting machines typically include a core drill, and one or more core bits. A core drill typically has a motor supported on a frame in a form analogous to a drill press. The motor provides rotary action to the core bits. Core cutting machines also have a mechanism for applying a force in an axial direction or in the direction of cutting. Such a mechanism may include a lever arm on a spindle that is configured to move the motor and bit axially along a guide beam of the frame. Thus, once a base of the frame has been secured to the substrate that is to be cut, rotary action can be imparted to the core bit and an axial force may be applied to engage the core bit with the substrate in order to commence removal of material for cutting and removing a core.

Core bits have a large variety of diametric and depth sizes to meet a large variety of user needs. As may be appreciated, core diameters range from as small as an inch to several feet. Similarly, core depths range from an inch or less to several feet. Hence, the material being cut from the substrate can be extremely massive. Dealing with these massive cores once they have been severed from the substrate can be challenging. When cutting through floors or ceilings, the severed cores will often simply fall out of the core bit to the floor or ground below once they have been severed from the substrate. To avoid any damage or harm that may be caused by these falling cores, a construction worker is sometimes positioned on an underside of the substrate when the core bit has almost passed through the substrate for the purpose of catching the core. Sometimes positioning the construction worker requires the worker to be raised to the proper position in a man lift. With moderate to extremely massive cores, the risks in grappling with the cores become great.

SUMMARY OF THE INVENTION

From the foregoing discussion, it should be apparent that a need exists for an apparatus, system, and method that inhibits free fall of cores from a core bit once they have been severed from a substrate. There is a need to reduce the amount of direct human contact with the core during catching of the core. Beneficially, such an apparatus, system, and method would reduce the risk of damage or harm caused by falling cores.

The present invention has been developed in response to the present state of the art, and in particular, in response to the problems and needs in the art that have not yet been fully solved by currently available core cutting machines, systems, and methods. Accordingly, the present invention has been developed to provide an apparatus, system, and method for catching cores that have been severed from substrates that overcome many or all of the above-discussed shortcomings in the art.

The apparatus for inhibiting cores from falling once severed from a substrate, in accordance with embodiments of the present invention, includes a core catcher for catching a core after cutting the core from a substrate. In one embodiment, the core catcher includes a catcher rod having a proximal end and a distal end and an attachment mechanism on the proximal end of the catcher rod configured for attaching the catcher rod to a core drill. The core catcher may include a catching element that is removably attachable to the catcher rod. The catcher rod has a length extending generally between the proximal end and the distal end and a width extending in a transverse direction relative to the length. The catching element has a dimension in the transverse direction that is greater than the width of the catcher rod when the catching element is in a deployed condition.

A system for catching a core cut from a substrate during core drilling in accordance with other embodiments of the invention includes a core catcher assembly with at least one catcher rod. The catcher rod has an attachment mechanism on a proximal end of the catcher rod. The core catcher assembly also includes a catching element for retaining a core on the catcher rod. The catching element is at least one of removably attachable to the catcher rod and movably mounted on the catcher rod for movement between a deployed and a non-deployed condition. The system may further include a core drill. The catcher rod is removably attachable to the core drill via the attachment mechanism.

Methods for inhibiting cores from falling once they have been severed from a substrate in accordance with the present invention are also presented. The methods include a method for catching a core that has been severed from a substrate during core cutting. The disclosed embodiments substantially include the steps necessary to carry out the functions presented above with respect to the operation of the described apparatus and system. In one embodiment, the method includes drilling a pilot hole in a substrate to be cut, inserting a catcher rod in the pilot hole, and attaching a proximal end of the catcher rod to a drill. The method also includes deploying a catching element on a distal end of the catcher rod.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
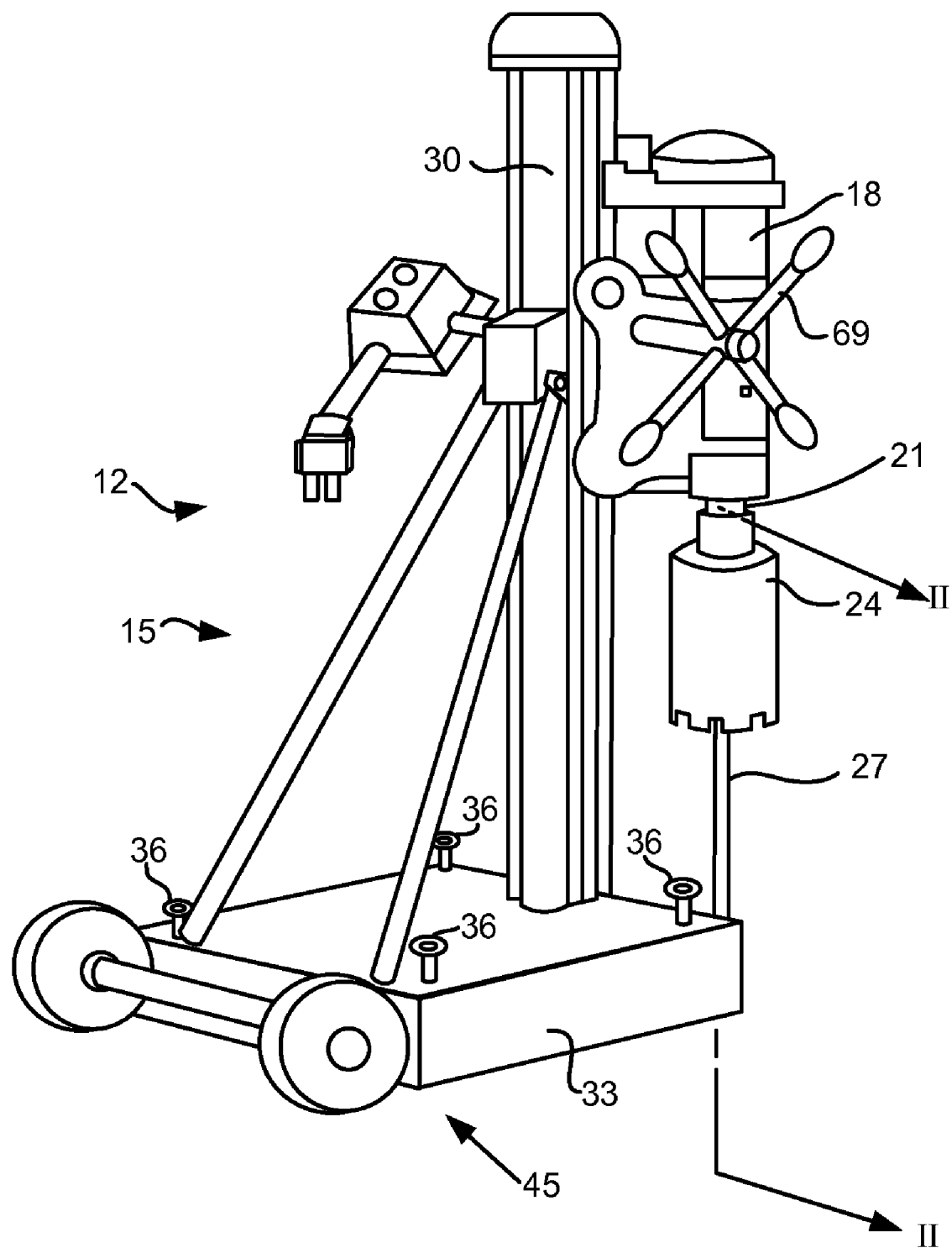
FIG. 1 is a perspective view illustrating one embodiment of a core cutting machine in accordance with the present invention.

FIG. 1 is a perspective view of a core drill or core cutting machine 12 having a frame 15 and a motor 18. At a distal end of the motor 18 is a chuck 21, to which is attached a core bit 24 and a catcher rod 27 in accordance with embodiments of the present invention. The frame, 15 includes a guide beam 30 and a base 33 on which the guide beam 30 is supported. The base 33 has anchor bolts 36 supported therein, as also shown in the diagrammatic partial sectional view of FIG. 2. The anchor bolts 36 are supported in threaded through holes such that the anchor bolts can be protracted through a bottom surface of the base 33 and in two anchors 39 that have been placed in a substrate 42 that is to be cut.

Figure 2:
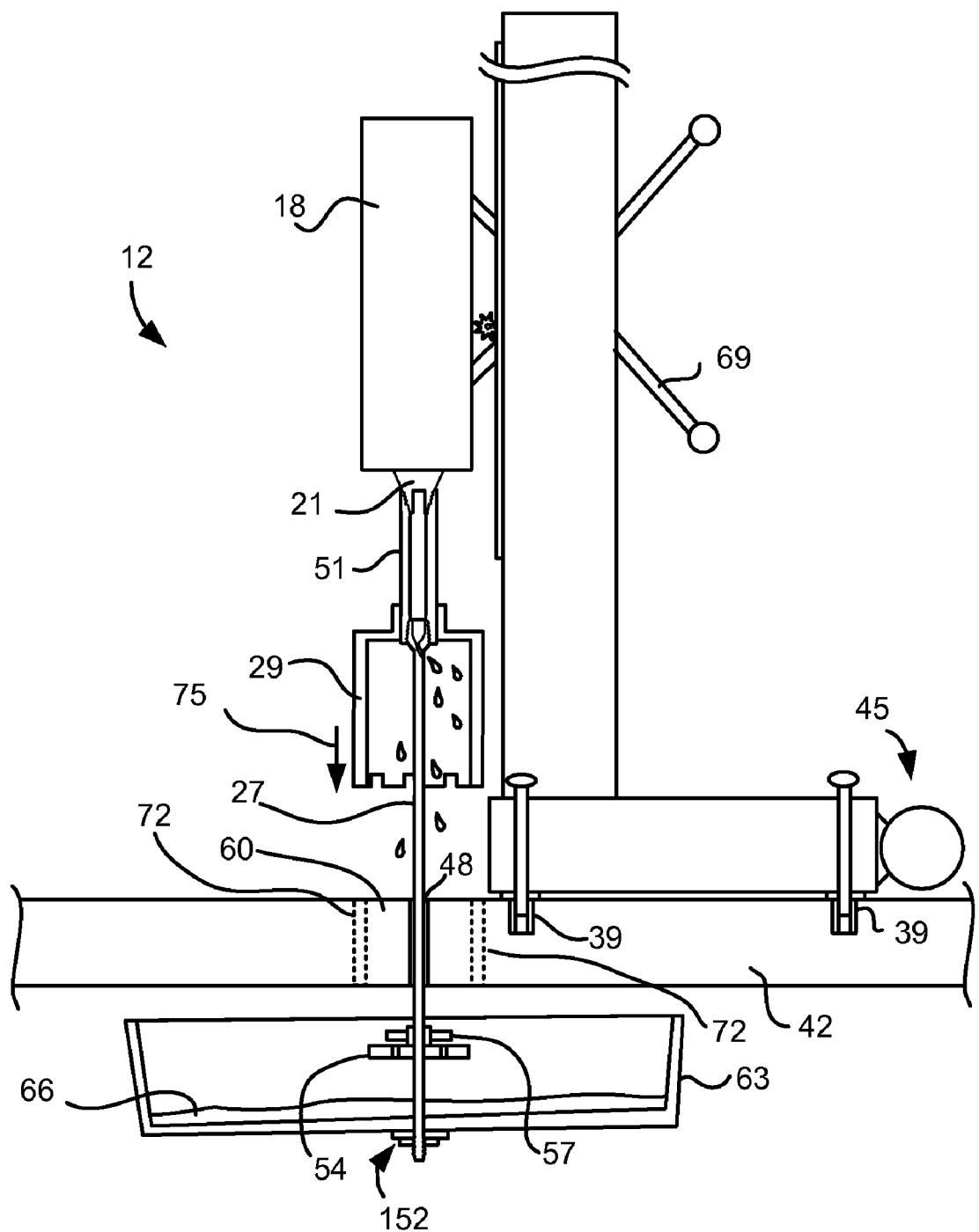
FIG. 2 is a diagrammatic partial sectional view taken along line II-II of FIG. 1 in accordance with the present invention.

As shown in FIGS. 1 and 2, the core cutting machine 12 may further include a set of wheels 45 so that the machine 12 may more easily be moved from one location of use to another. Once the core cutting machine 12 has been transported to a location for cutting a core, and after the anchors 39 have preliminarily been placed in the substrate 42, the anchor bolts 36 can be engaged in the anchors 39 to secure the core cutting machine 12 in place for cutting the core. Also preliminarily, the location of the cut may be marked on the substrate 42 and a pilot hole 48 drilled with a hammer drill, for example.

As shown in the diagrammatic partial sectional view of FIG. 2, the catcher rod 27 is inserted through the pilot hole 48. A proximal end of the catcher rod 27 is attached to the chuck 21. The core bit 24 is also attached to the chuck 21. Optionally, an extension 51 is interposed for connecting the core bit 24 and the catcher rod 27 to the chuck 21 at an extended position. Before making the cut in the substrate 42, a catching element 54 is deployed on a distal end of the catcher rod 27 on an underside of the substrate 42. A bearing 57 may be placed on the catcher rod between the catching element 54 and the substrate 42. By placing the catching element 54 close to the substrate 42, a core 60 is inhibited from falling very far. The bearing 57 can help allow the core 60 to rotate while imparting reduced frictional rotational forces to the catching element 54 once the core 60 has broken loose from the substrate 42.

FIG. 2 also shows an embodiment having a bucket 63 supported on the distal end of the catcher rod 27. In this embodiment, the bucket 63 receives cutting fluid 66 that flows through the pilot hole 48 and an opening left in the substrate 42 after cutting the core 60 from the substrate 42. Thus, the cutting fluid 66 can also be kept from falling to the floor or ground below the substrate 42.

As depicted in FIGS. 1 and 2, once the core cutting machine 12 has been secured in position, a lever 69 can be rotated by a user to move. The motor 18, and bit 24 into engagement with the substrate 42 to make the cut. Because of the cylindrical structure of the core bit 24 material will be removed around a circumference of the core 60 as indicated by the dashed lines 72. By applying pressure in a cutting or axial direction 75 by further rotation of the lever arm 69 and/or other mechanisms. The core bit 24 is caused to progress through the substrate 42. When the core bit has passed completely through the substrate 42 the core 60 is severed from the substrate 42. Once this occurs, the core 60 falls the short distance to the bearing 57 and/or the catching element 54, and is inhibited from falling free from the catcher rod 27.

Figure 3A:
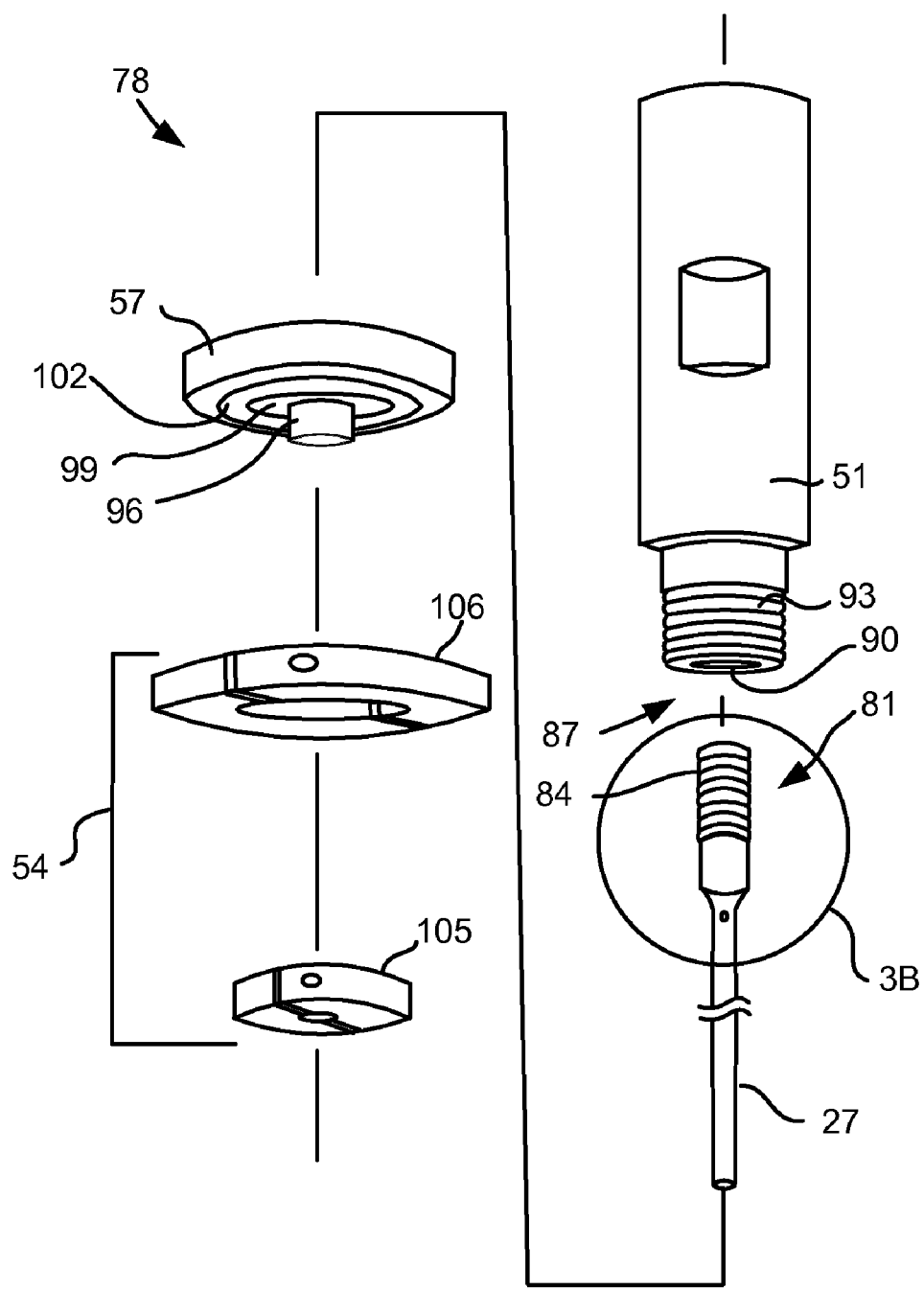
FIG. 3A is an exploded perspective view of a core catcher assembly in accordance with an embodiment of the present invention.

FIG. 3A is an exploded view of an embodiment of a core catcher assembly 78 in accordance with the present invention. The core catcher assembly 78 may include one or more of the catcher rod 27, the extension 51, the bearing 57, and the catching element 54. It is to be understood that the core catcher assembly 78 may include additional elements such as additional extensions, catcher rods, catching elements, and/or buckets, all of which may be removably attachable to each other and to the core cutting machine or drill 12. The core catcher assembly may further include one or more core bits and/or other components.

As shown in FIG. 3A, a proximal end of the catcher rod 27 has an attachment mechanism 81, which in the illustrated embodiment, includes external threads 84. The attachment mechanism 81 may be received by a complementary attachment mechanism 87 in a distal end of the extension 51. The complementary attachment mechanism, 87 may include internal threads 90 in the distal end of the extension 51, as shown in FIG. 3A. As may be appreciated, external threats 93 on the distal end of the extension 51 are configured to receive the core bit. Alternatively, the complementary attachment mechanism with its internal threads and the external threads for receiving the core bit may be provided directly on the chuck 21 of the core cutting machine 12.

As shown in FIG. 3A, the bearing 57 may include a sleeve 96 sized to slidably receive the catcher rod 27 therethrough. Thus, the bearing 57 will generally slide down into a position adjacent to and proximal of the catching element 54. In this way, both the bearing 57 and the catching element 54 are removably attachable to the catcher rod. The bearing 57 also has a stationary central portion 99, and one or more movable outer portions 102 that are free to rotate on the central portion 99. Thus, when a core engages the outer portion 102, it is permitted to rotate without friction relative to the central portion 99 and the catcher rod 27.

The catching element 54 in the embodiment shown in FIG. 3A has two clamping collars 105, 106. A smaller one of the collars 105, is sized to be clampingly received on the catcher rod 27. Once on the catcher rod 27, screws can be tightened to secure the collar 105 on the rod 27. Similarly, the larger collar 106 can be clamped on an outer circumference of the smaller color 105. In this way the colors 105, 106 of the catching element 54 provide a rigid extension of the catcher rod 27 that has a width dimension greater than that of the catcher rod 27 itself. Thus the catching element 54 provides a barrier to passage of the core 60 off the catcher rod 27. It is to be understood that any of a variety of other clamping devices or other mechanisms can be used in place of the collars 105, 106 to provide the catching element 54. Similarly, any of a variety of other bearings may be substituted for the bearing 57. Further alternatively, an integral bearing and catching element could be substituted for the bearing 57 and catching element 54.

Figure 3B:
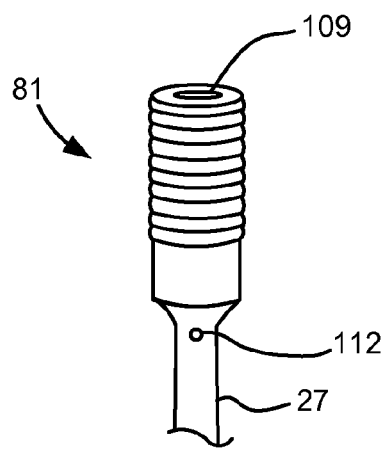
FIG. 3B is a perspective view of a portion 3B of FIG. 3A.

FIG. 3B is a perspective view of a portion 3B of FIG. 3A that includes the attachment mechanism 81. As shown, the proximal end of the catcher rod 27 has an opening 109 forming a passageway extending into the proximal end of the catcher rod 27. The passageway extends axially and opens out through a side wall of the catcher rod 27 via a duct 112, as shown in FIG. 2. The passageway receives cutting fluid from the core cutting machine 12 and directs the cutting fluid radially outward, as shown in the diagrammatic view of FIG. 2.

Figure 4:
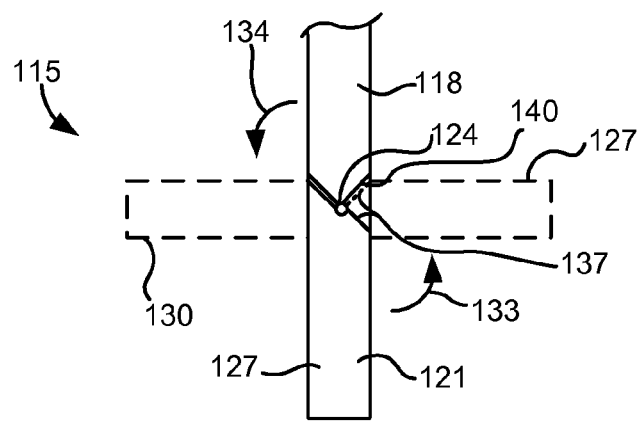
FIG. 4 is a diagrammatic side view of a catching element in accordance with an alternative embodiment of the present invention.

FIG. 4 shows a catching element 115 that is movably connected to a catcher rod 118 in accordance with an alternative embodiment of the invention. In this embodiment, the catcher rod 118 is an alternative catcher rod that has a movable tip 121 that is capable of rotating about a pivot 124. The tip 121 has a portion 127 that is distal to the pivot 124 in a non-deployed condition shown in solid lines in FIG. 4. The tip 121 also has a portion 130 that is proximal of the pivot 124 in the non-deployed condition. In the non-deployed condition, the portion 130 is hidden within the catcher rod 118, such as within a slot. In a deployed condition, the tip 121 is rotated clockwise as indicated by arrows 133, 134, such that the portion 127 moves upwardly and to the right while portion 130 moves downwardly and into the left. In the deployed condition, a stop element 137 of the tip 121 moves to a stop element 140 of the catcher rod 118. The stop elements 137, 140 hold the tip 121 in a generally transverse relation relative to the catcher rod 118 in the deployed condition. Thus, the catching element 115 functions similarly to the catching element 54, to provide a width dimension greater than that of the catcher rod 118. As may be appreciated, a friction element, magnet, clip, or other mechanism may be provided to hold the tip 121 in one or both of the deployed and non-deployed conditions.

Figure 5:
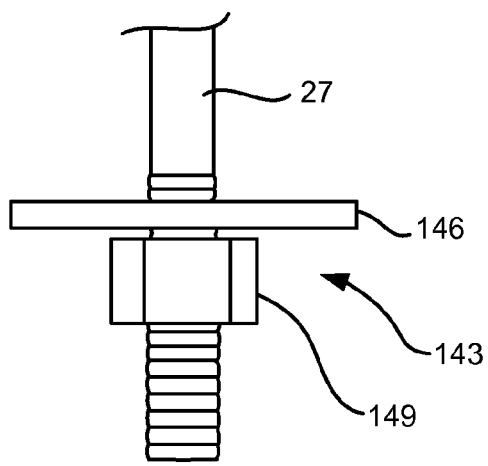
FIG. 5 is a side view of a catching element in accordance with a further alternative embodiment of the present invention.

FIG. 5 is a side view of a core catching element 143 in accordance with a further alternative or additional embodiment of the invention. The core catching element 143 includes a washer 146 and a nut 149 for holding the washer 146 on the catcher rod 27. The catcher rod 27 shown in FIG. 5 may be generally similar to the catcher rod 27 shown in FIGS. 1-3B, and may include threads on only a most distal portion, or may include threads that extend a substantial portion of the length of the catcher rod from its distal end. Thus, either one or both of the catching element 54 and a retaining element 152 for holding the bucket 63 on the catcher rod 27 may be replaced by the catching element 143. As may be appreciated, any of a variety of pins, locks, and plates, or any combination thereof may be used to provide a catching element or retaining mechanism for inhibiting a core from falling off the catcher rod or for retaining the bucket 63.

In accordance with embodiments of the invention, it is to be understood that the catcher rod 27/118 may be attached directly to the chuck 21, or may be attached to the chuck 21 by the extension 51. As such, the chuck 21 may be provided with internal threads similar to the internal threads 90 shown on the distal end of the extension 51 in FIG. 3A. Similarly, core bits may be receive directly on external threads on the chuck 21 or on the extension 51.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
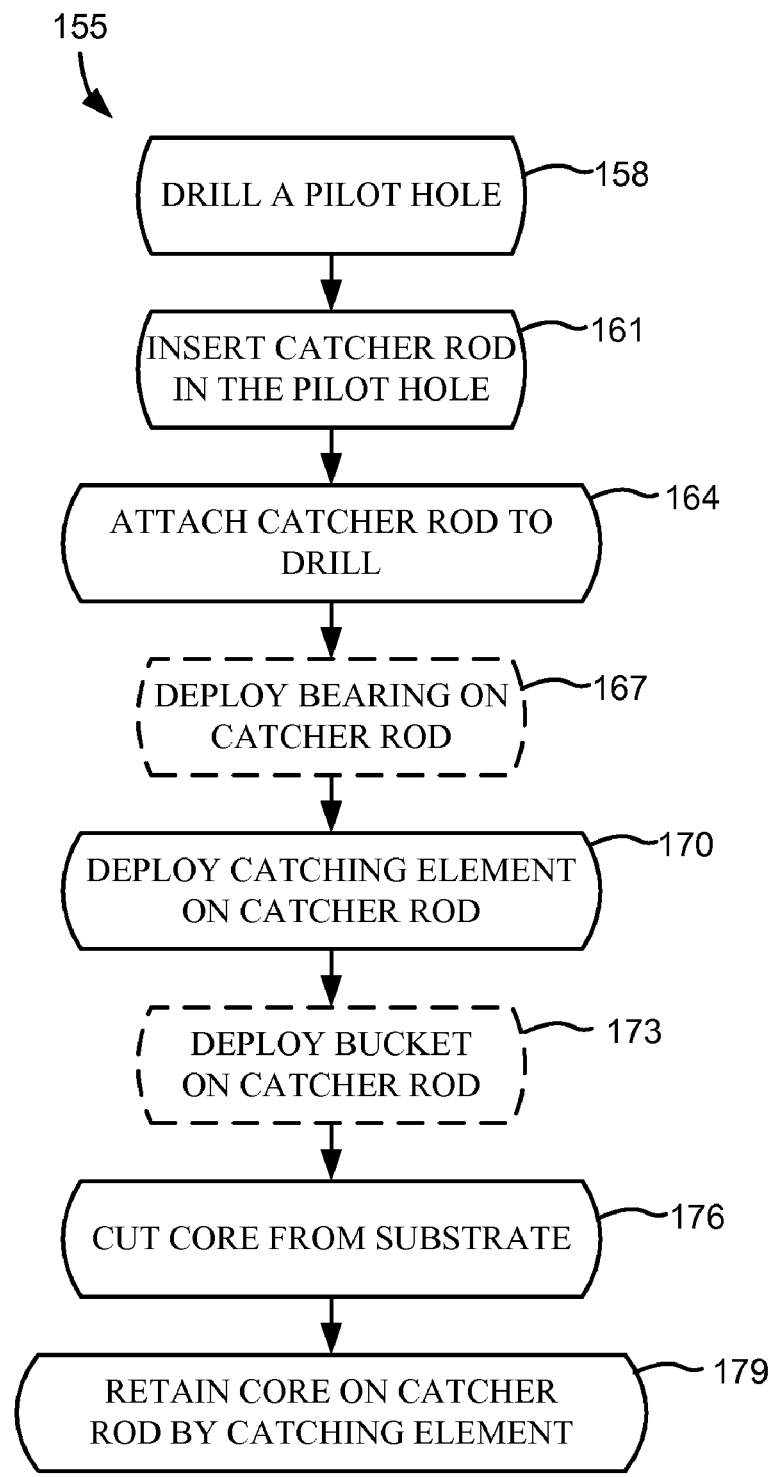
FIG. 6 is a schematic block diagram illustrating a method in accordance with an embodiment of the present invention.

FIG. 6 shows a schematic block diagram 155 representing a method in accordance with an embodiment of the present invention. At block 158, the diagram represents the operation of drilling a pilot hole, and block 161 represents inserting the catcher rod into the pilot hole. Once the catcher rod has been inserted into the pilot hole, the catcher rod is attached to the core drill, as indicated by block 164. Attaching the catcher rod to the core drill may include steps of attaching a proximal end of the catcher rod to a distal end of an extension, and attaching a proximal end of the extension to the core drill. Attaching the proximal ends of the catcher rod and extension may further include engaging threads.

The method may further include deploying a bearing on the catcher rod, as indicated at block 167, and deploying a catching element on the catcher rod, as indicated at block 170. Deploying the catching element may include clamping the catching element on a distal end of the catcher rod at a position distal to the bearing and distal of a substrate to be cut. The method may further include deploying a bucket on the distal end of the catcher rod distally of the catching element, as indicated at block 173, and catching a cutting fluid in the bucket, as indicated at block 176. 14. The may further include directing a cutting fluid radially outward from a duct through an outer surface of the catcher rod.

The method may further include cutting a core from the substrate and inhibiting the core from falling by engaging the core with the catching element, as indicated at block 179.

The method may include additional steps or operations other than those shown in the diagram 155 of FIG. 6. For example, the method may include attenuating or dampening vibrations (or chatter), such as by engagement of the cutter rod in the pilot hole. In this regard, placement of the pilot hole slightly off center may be beneficial. Also, one or more of the steps shown may be omitted without departing from the spirit and scope of the present invention. For example, blocks 167 and 173 are shown in dashed lines in order to illustrate that in some embodiments the method does not require deploying the bearing on the catcher rod or deploying the bucket on the catcher rod. Others of the illustrated steps may also be omitted without limitation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A core catcher for catching a core after cutting the core from a substrate, the core catcher comprising:
   a catcher rod having a proximal end and a distal end;
   an attachment mechanism on the proximal end of the catcher rod configured for attaching the catcher rod to a core drill;
   a catching element removably attached to the catcher rod; wherein:
      the catcher rod has a length extending generally between the proximal end and the distal end, and a width extending in a transverse direction relative to the length; and
      the catching element has a dimension in the transverse direction that is greater than the width of the catcher rod when the catching element is removably attached to the catcher rod in a deployed condition.

2. The core catcher of claim 1, further comprising a core drill extension having a proximal end configured for attachment to a core drill and a distal end having a complementary attachment mechanism for receiving the attachment mechanism on the proximal end of the catcher rod.

3. The core catcher of claim 1, wherein the catcher rod has structure defining a passageway extending into the proximal end and out through a duct in an outer surface of the catcher rod.

4. The core catcher of claim 1, wherein the catching element comprises a clamping collar.

5. The core catcher of claim 1, further comprising a bearing removably attachable to the catcher rod at a position adjacent to and proximal of the catching element on the catcher rod.

6. The core catcher of claim 1, further comprising a bucket removably attachable to the catcher rod at a position distal of the catching element.

7. A system for catching a core cut from a substrate during core drilling, the system comprising:
   a core catcher assembly including at least one catcher rod;
   an attachment mechanism on a proximal end of the catcher rod; and
   a catching element for retaining a core on the catcher rod, the catching element being of a removably attached to the catcher rod.

8. The system of claim 7, further comprising a core drill, wherein the catcher rod is removably attachable to the core drill via the attachment mechanism.

9. The system of claim 7, wherein:
   the core catcher assembly further comprises an extension having a proximal end and a distal end, the distal end of the extension further having a complementary attachment mechanism for receiving the attachment mechanism on the proximal end of the catcher rod; and
   a proximal end of the extension is removably attachable to the core drill.

10. The system of claim 7, wherein the core catcher assembly further comprises a bearing to be disposed between the catching element and a core.

11. The system of claim 7, wherein the core catcher assembly further comprises a bucket removably attachable to the catcher rod at a position distal to the catching element.

12. A method for catching a core, the method comprising:
   drilling a pilot hole in a substrate to be cut;
   inserting a catcher rod in the pilot hole;
   attaching a proximal end of the catcher rod to a drill; and
   removably attaching a catching element on a distal end of the catcher rod.

13. The method of claim 12, wherein attaching a proximal end comprises attaching the proximal end to an extension.

14. The method of claim 12, further comprising directing a cutting fluid radially out from a duct through an outer surface of the catcher rod.

15. The method of claim 12, wherein attaching the proximal end of the catcher rod further comprises engaging threads.

16. The method of claim 12, wherein removably attaching the catching element comprises clamping the catching element on the distal end of the catcher rod.

17. The method of claim 12, further comprising deploying a bearing on the distal end of the catcher rod proximally of the catching element.

18. The method of claim 12, further comprising deploying a bucket on the distal end of the catcher rod distally of the catching element.

19. The method of claim 18, further comprising catching a cutting fluid in the bucket.

20. The method of claim 12, further comprising cutting a core from the substrate and inhibiting the core from falling by engaging the core with the catching element.

21. A core catcher for catching a core after cutting the core from a substrate, the core catcher comprising:
   a catcher rod having a proximal end and a distal end;
   an attachment mechanism on the proximal end of the catcher rod configured for attaching the catcher rod to a core drill;
   a catching element removably attached to the catcher rod; wherein:
      the catcher rod has a length extending generally between the proximal end and the distal end, and a width extending in a transverse direction relative to the length;
      the catching element has a dimension in the transverse direction that is greater than the width of the catcher rod when the catching element is in a deployed condition; and
      the catcher rod has structure defining a passageway extending into the proximal end and out through a duct in an outer surface of the catcher rod.

22. A system for catching a core cut from a substrate during core drilling, the system comprising:
   a core catcher assembly including at least one catcher rod;
   an attachment mechanism on a proximal end of the catcher rod; and
   a catching element comprising a clamping collar for retaining a core on the catcher rod, the catching element removably attachable to the catcher rod.

* * * * *